United States Patent
Fordos et al.

(10) Patent No.: US 12,103,139 B2
(45) Date of Patent: Oct. 1, 2024

(54) VACUUM TOOL INCLUDING AT LEAST ONE IMPROVED SEALING GASKET

(71) Applicant: Airbus Operations SAS, Toulouse (FR)

(72) Inventors: Nicolas Fordos, Toulouse (FR); Corentin Roux, Toulouse (FR); Jean-Claude Martineau, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 466 days.

(21) Appl. No.: 17/088,025

(22) Filed: Nov. 3, 2020

(65) Prior Publication Data

US 2021/0129295 A1    May 6, 2021

(30) Foreign Application Priority Data

Nov. 5, 2019  (FR) ...................................... 1912384

(51) Int. Cl.
| | |
|---|---|
| *B25B 11/00* | (2006.01) |
| *F16J 15/00* | (2006.01) |
| *F16J 15/06* | (2006.01) |
| *F16J 15/10* | (2006.01) |

(52) U.S. Cl.
CPC ........... *B25B 11/005* (2013.01); *F16J 15/002* (2013.01); *F16J 15/062* (2013.01); *F16J 15/102* (2013.01)

(58) Field of Classification Search
CPC ...... B25B 11/005; F16J 15/002; F16J 15/061; F16J 15/102
See application file for complete search history.

(56) References Cited

U.S. PATENT DOCUMENTS

| | | | | |
|---|---|---|---|---|
| 3,642,248 | A | * | 2/1972 | Benware .................... F16K 3/12 251/174 |
| 4,113,268 | A | * | 9/1978 | Simmons ............... F16K 1/2266 251/173 |
| 4,779,841 | A | * | 10/1988 | Pupillo ................... F16J 15/061 251/306 |
| 5,454,552 | A | | 10/1995 | Boiteux |
| 5,687,975 | A | | 11/1997 | Inciong |
| 9,161,462 | B2 | * | 10/2015 | Schwaiger ........... H05K 5/0017 |
| 2020/0166296 | A1 | * | 5/2020 | Klusek .................. F28F 9/0226 |

FOREIGN PATENT DOCUMENTS

EP        0604339 A1     6/1994

OTHER PUBLICATIONS

French Search Report; priority document.

* cited by examiner

*Primary Examiner* — Logan M Kraft
*Assistant Examiner* — Johnny H Hoang
(74) *Attorney, Agent, or Firm* — Greer, Burns & Crain, Ltd.

(57) ABSTRACT

A vacuum tool designed to immobilize a part, including at least one sealing gasket and at least one groove in a bearing surface that is configured to at least partially receive the sealing gasket. The groove has a central slot and right- and left-hand gaps arranged on either side of the central slot. The sealing gasket has a lower portion cooperating with the central slot of the groove and an upper portion in contact with the part when in operation, and right- and left-hand flanges that are seated respectively in the right- and left-hand gaps. These flanges provide a better hold for the sealing gasket in the groove, notably in the curved sections thereof.

10 Claims, 3 Drawing Sheets

VACUUM TOOL INCLUDING AT LEAST ONE IMPROVED SEALING GASKET

CROSS-REFERENCES TO RELATED APPLICATIONS

This application claims the benefit of the French patent application No. 1912384 filed on Nov. 5, 2019, the entire disclosures of which are incorporated herein by way of reference.

FIELD OF THE INVENTION

The present application relates to a vacuum tool including at least one improved sealing gasket.

BACKGROUND OF THE INVENTION

According to an embodiment shown in FIG. 1, a vacuum tool 10 used to immobilize a part 12 includes a bearing surface F10 shaped like the part 12 to be immobilized and a sealing gasket 14 interposed between the vacuum tool 10 and the part 12. This sealing gasket 14 describes a closed loop that forms a cavity 16 with the bearing surface F10 and the part 12. The vacuum tool also has at least one suction conduit 18 that opens into the cavity 16 and is linked to a suction system designed to aspirate the air in the cavity 16.

According to a layout shown in FIG. 2, the sealing gasket 14 has a rectangular cross section of height H14 (dimension measured in a direction perpendicular to the bearing surface F10) and of width L14 (dimension measured in a direction parallel to the bearing surface F10). For each sealing gasket 14, the vacuum tool 10 has a groove 20 designed to at least partially receive the sealing gasket 14. This groove 20 has a central slot 22 of a first depth P22 that is less than the height H14 of the sealing gasket 14, and a width L22 that is substantially equal to the width L14 of the sealing gasket 14, as well as two gaps 24.1, 24.2 arranged on either side of the central slot 22 of a depth P24 that is less than the first depth P22.

To ensure that the gasket remains in position in the groove 20, in particular along the curved sections thereof, the sealing gasket 14 is glued using a strong two-component glue 26 interposed between the bottom F22 of the central slot 22 and the sealing gasket 14.

When in operation, the sealing gasket 14 is compressed and deforms to fill the two gaps 24.1, 24.2.

During machining, the cutting liquid used tends to flow into the groove 20 and to soak into the sealing gasket 14. This results in the premature deterioration of the properties of the sealing gasket 14.

Furthermore, when soaked in water, the sealing gasket 14 tends to be compressed incorrectly and to be skewed (as shown using mixed lines in FIG. 2), increasing the risk of pinching the sealing gasket 14 outside the groove 20, between the bearing surface F10 and the part 12. This pinching also results in the premature deterioration of the sealing gasket 14.

Since the strong glue used to fasten the sealing gasket is very hard to remove, the operation to change the sealing gasket is difficult and requires the use of chemical products to completely strip the bottom F22 of the central slot 22, which requires a long drying cycle before the vacuum tool can be brought back into use.

The present invention is intended to address some or all of the drawbacks in the prior art.

SUMMARY OF THE INVENTION

Accordingly, the invention relates to a vacuum tool designed to immobilize a part, the vacuum tool comprising a bearing surface, at least one sealing gasket that is interposed when in operation between the bearing surface and the part and at least one groove in the bearing surface that is designed and configured to at least partially receive the sealing gasket, the groove having a central slot having a main bottom wall and main right- and left-hand side walls, as well as right- and left-hand gaps that are arranged on either side of the central slot, each having a secondary bottom wall and a right- or left-hand secondary side wall, the sealing gasket having a lower portion that cooperates with the central slot and an upper portion that is in contact with the part when in operation.

According to the invention, the sealing gasket has right- and left-hand flanges that are interposed between the lower and upper portions thereof, extending on either side of the lower portion and being seated respectively in the right- and left-hand gaps.

This geometry improves the hold of the sealing gasket in the groove, more specifically in the curved sections of the groove, such that it is no longer necessary to use strong glue to fasten the sealing gasket in the groove.

According to another feature, each right- or left-hand flange has a lower face, an upper face, and an end face. The width of each of the right- and left-hand flanges is substantially equal to the width of the right- or left-hand gap receiving the respective flange, the lower and end faces of the right-hand flange being pressed respectively against the secondary bottom and secondary side walls of the right-hand gap, the lower and end faces of the left-hand flange being respectively pressed against the secondary bottom and secondary side walls of the left-hand gap.

According to another feature, the height of each end face of the right- and left-hand flanges is equal to or less than half of the depth of the right- and left-hand gaps.

According to another feature, the upper portion of the sealing gasket has an apex with a curved circular arc shape.

According to another feature, the radius of the circular arc is between 3 mm and 6 mm.

According to another feature, the maximum width of the upper portion is equal to or less than the width of the lower portion diminishing gradually towards the apex.

According to another feature, the sealing gasket has a longitudinal recess.

According to another feature, the longitudinal recess is positioned between the two flanges, at least partially inside the lower portion of the sealing gasket.

According to another feature, the longitudinal recess has a circular cross section and a diameter substantially equal to the diameter of the circular arc of the apex of the upper portion.

According to another feature, the sealing gasket is made of a chloroprene elastomer.

BRIEF DESCRIPTION OF THE DRAWINGS

Other features and advantages are set out in the description of the invention below, given purely by way of example and with reference to the attached drawings, in which.

DETAILED DESCRIPTION OF THE PREFERRED EMBODIMENTS

Figure 1:
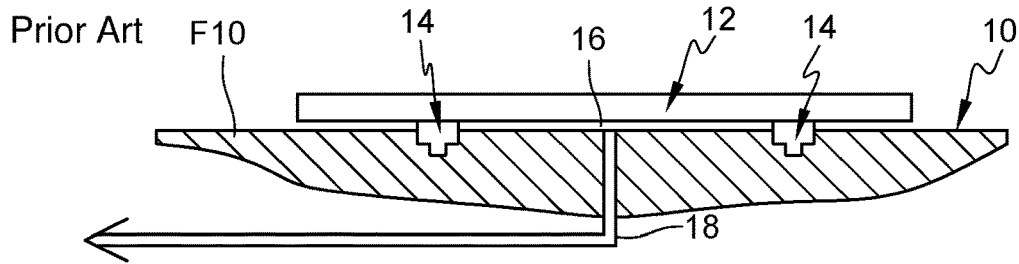
FIG. 1 is a diagram of a vacuum tool showing an embodiment from the prior art.
Figure 2:
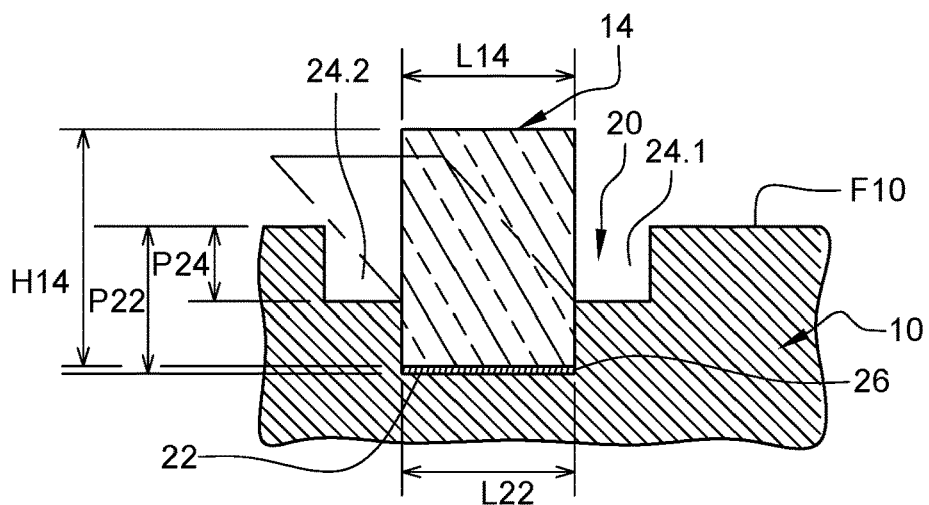
FIG. 2 is a cross section of a groove and a sealing gasket showing an embodiment from the prior art.
Figure 3:
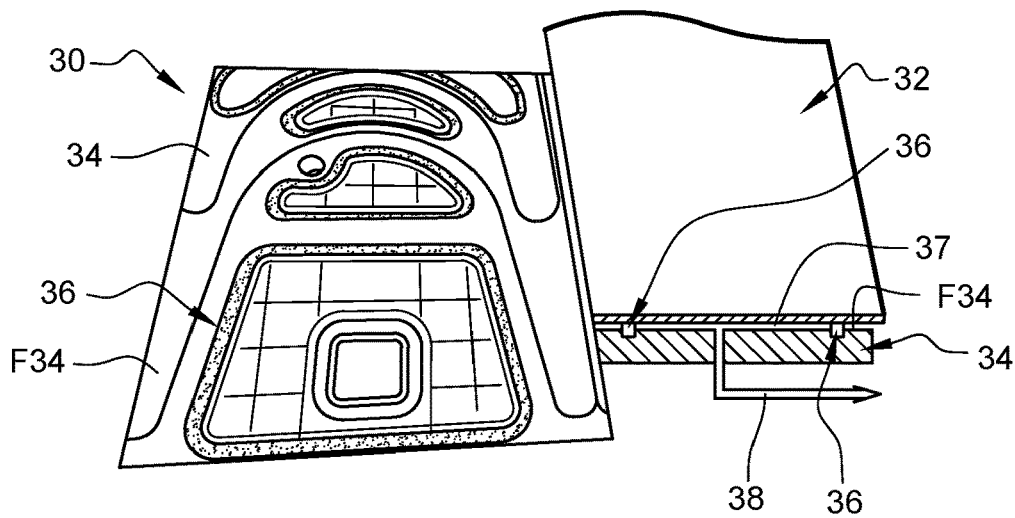
FIG. 3 is a perspective view with a partial cut-out of a vacuum tool showing an embodiment of the invention.
Figure 4:
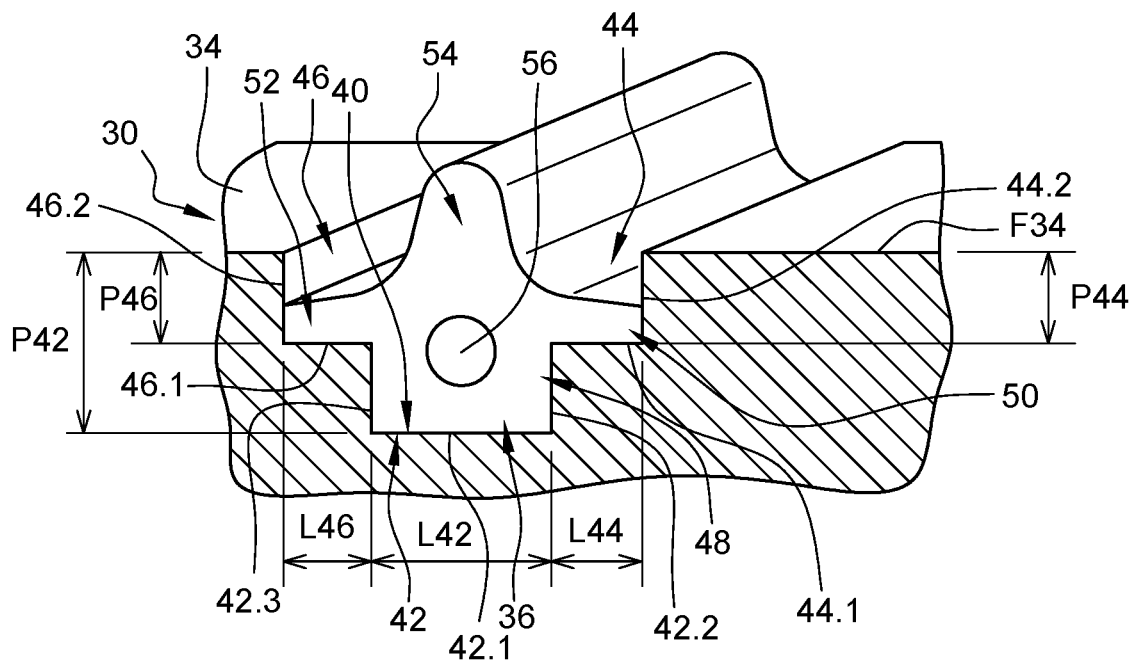
FIG. 4 is a cross section of a portion of a vacuum tool showing an embodiment of the invention.
Figure 5:
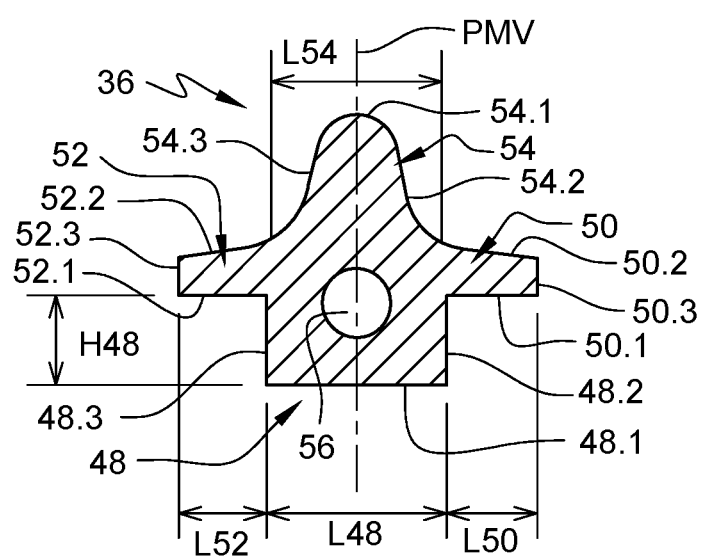
FIG. 5 is a cross section of a sealing gasket showing an embodiment of the invention.
Figure 6:
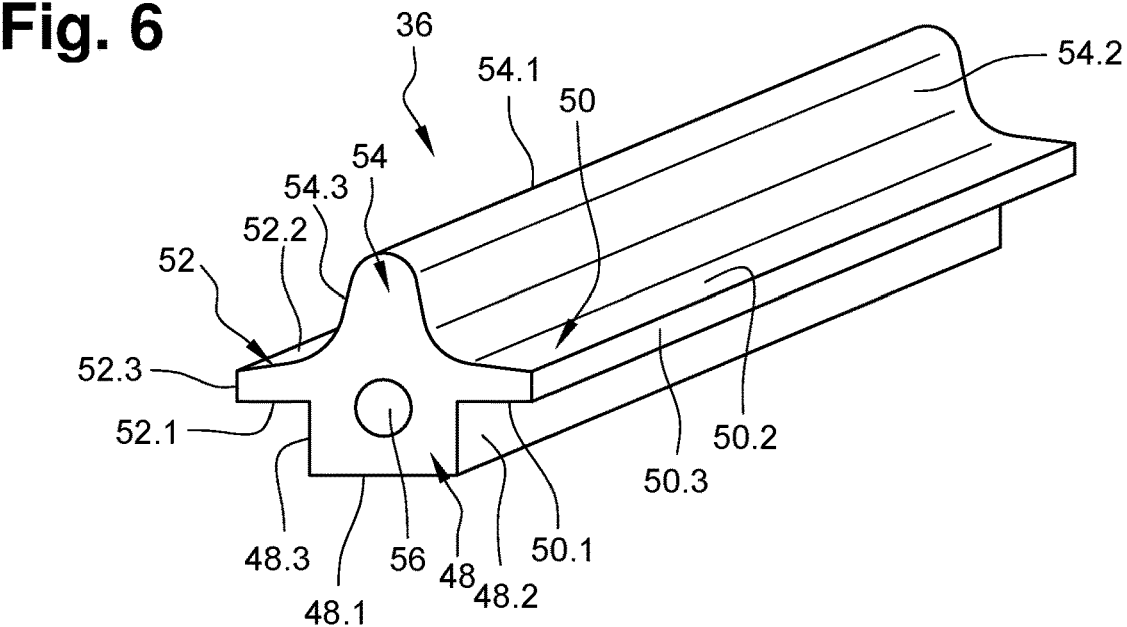
FIG. 6 is a perspective view of a section of a sealing gasket showing an embodiment of the invention.
Figure 7:
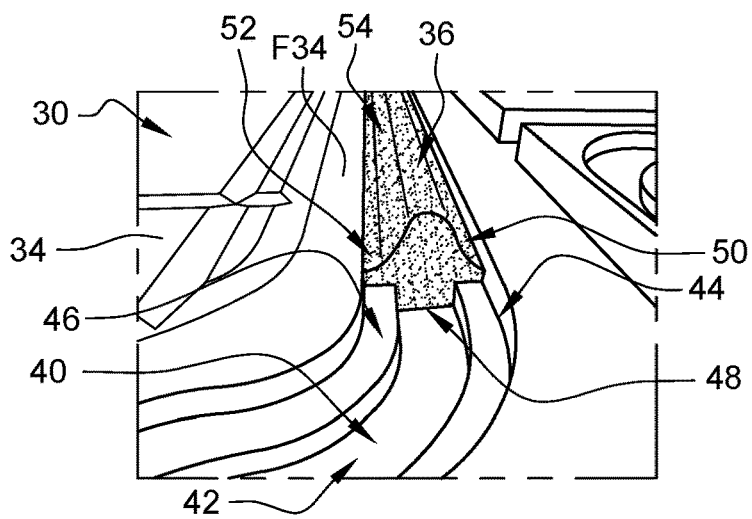
FIG. 7 is a perspective view of a portion of a vacuum tool fitted with the sealing gasket shown in FIGS. 5 and 6.
Figure 8:
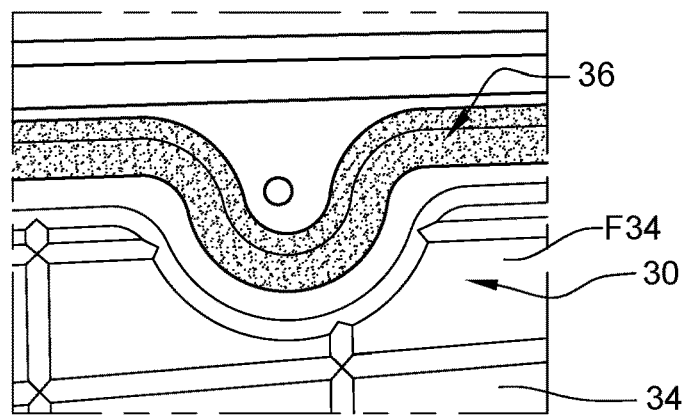
FIG. 8 is a top view of a portion of a vacuum tool fitted with the sealing gasket shown in FIGS. 5 and 6.

FIG. 3 shows a vacuum tool 30 on which at least one part 32 is immobilized. According to one application, such a vacuum tool 30 is used to machine (route, drill, surface, mill, etc.) a part 32 made of composite material in the form of a plate, such as a panel of a fuselage of an aircraft. Naturally, the invention is not limited to this application.

The vacuum tool 30 can include several trays 34 that are articulated together to adapt to the curvature of the part 32 to be immobilized.

The vacuum tool 30 has at least one tray 34 with a bearing surface F34 that is oriented towards the part 32 when in operation, and at least one sealing gasket 36 that is interposed when in operation between the bearing surface F34 and the part 32. This sealing gasket 36 delimits a cavity 37 with the tray 34 and the part 32. The vacuum tool 30 also has at least one suction conduit 38 that opens into the cavity 37 and is linked to a suction system (not shown) designed and configured to aspirate the air in the cavity 37.

The tray 34 has at least one groove 40 that is hollowed out of the bearing surface F34 and that describes a closed loop designed and configured to at least partially receive a sealing gasket 36. In the present application, a sealing gasket 36 is understood to be a single sealing gasket or several sealing gaskets arranged end to end.

This groove 40 has a central slot 42 with a main bottom wall 42.1 and right- and left-hand main side walls 42.2, 42.3, as well as right- and left-hand gaps 44, 46 arranged on either side of the central slot 42, each having a secondary bottom wall 44.1, 46.1 and a right- or left-hand secondary side wall 44.2, 46.2.

According to one layout, the right- and left-hand gaps 44, 46 are symmetrical about the central slot 42. The right- and left-hand main side walls 42.2, 42.3 are approximately perpendicular to the main bottom wall 42.1. The width L42 of the central slot 42 is the distance separating the right- and left-hand main side walls 42.2, 42.3 and the depth P42 thereof is the distance separating the main bottom wall 42.1 and the bearing surface F34. The right- and left-hand gaps 44, 46 are of substantially the same depth P44, P46, which is less than the depth P42 of the central slot 42, and of the same width L44, L46, which is the distance separating the right-hand main side wall 42.2 (respectively left-hand main side wall 42.3) and the right-hand secondary side wall 44.2 (respectively left-hand secondary side wall 46.2).

With the exception of the sealing gasket(s) 36, the other elements of the vacuum tool are identical to the elements in the prior art and therefore not described.

The sealing gasket 36 has a substantially constant cross section over the length thereof, which includes a lower portion 48 cooperating with the central slot 42, an upper portion 54 in contact with the part 32 when in operation, and right- and left-hand flanges 50, 52 that are interposed between the lower and upper portions 48, 54, extending on either side of the lower portion 48 and being seated respectively in the right- and left-hand gaps 44, 46.

According to one embodiment, the cross section of the sealing gasket 36 is symmetrical about a vertical median plane PMV of the sealing gasket 36.

The lower portion 48 has a base 48.1 and right- and left-hand side faces 48.2, 48.3. The width L48 of the lower portion 48 (distance separating the right- and left-hand side faces 48.2, 48.3) is substantially equal to the width L42 of the central slot 42 of the groove 40. The height H48 of the lower portion 48, which is the distance separating the base 48.1 and the right- and left-hand flanges 50, 52, is substantially equal to the distance separating the main bottom wall 42.1 and the secondary bottom walls 44.1, 46.1.

Thus, when the sealing gasket 46 is positioned in the groove 40, the lower portion 48 of the sealing gasket 36 fills the main slot 42; the base 48.1 and the right- and left-hand side faces 48.2, 48.3 of the lower portion 48 being in contact respectively with the main bottom wall 42.1 and the right- and left-hand main side walls 42.2, 42.3 of the central slot 42.

Each right- or left-hand flange 50, 52 has a lower face 50.1, 52.1, an upper face 50.2, 52.2, and an end face 50.3, 52.3.

According to a specific detail of the invention, the width L50, L52 of each of the right- and left-hand flanges 50, 52 is substantially equal to the width of the right- or left-hand gap 44, 46 receiving the respective flange. Thus, when in operation, the lower and end faces 50.1, 50.3 of the right-hand flange 50 are pressed respectively against the secondary bottom and secondary side walls 44.1, 44.2 of the right-hand gap 44. Complementarily, the lower and end faces 52.1, 52.3 of the left-hand flange 52 are pressed respectively against the secondary bottom and secondary side walls 46.1, 46.2 of the left-hand gap 46.

These two right- and left-hand flanges 50, 52, adjusted to the right- and left-hand gaps 44, 46, help to keep the sealing gasket 36 in the groove 40, notably in the curved sections thereof, such that it is no longer necessary to glue the sealing gasket 36 with a strong glue to hold the sealing gasket in the groove 40.

This means that the sealing gasket 36 can be easily removed and replaced, without having to clean the groove 40 using chemical products.

If necessary, an adhesive with a lesser adhesive capacity than the two-component strong glue in the prior art can be used to improve the hold of the sealing gasket 36 in the groove 40. This adhesive can be positioned on the sealing gasket 36 on the lower faces 50.1, 52.1 of the right- and left-hand flanges 50, 52 and/or on the base 48.1 and/or on the right- and left-hand side faces 48.2, 48.3 of the lower portion 48. This adhesive is designed and configured to remain bonded to the sealing gasket 36 after the sealing gasket is removed.

According to one embodiment, the height of each end face 50.3, 52.3 is equal to or less than half of the depth P44, P46 of the right- and left-hand gaps 44, 46.

The fact that the right- and left-hand flanges 50, 52 at least partially fill the right- and left-hand gaps 44, 46 helps to limit the accumulation of liquid in the groove 40.

According to one layout, the upper portion 54 of the sealing gasket 36 has an apex 54.1 with a curved circular arc shape. According to one embodiment, the radius of the circular arc is between 3 mm and 6 mm.

The fact that the upper portion 54 has an apex 54.1 with a circular arc shape in contact with the part 32 when in operation enables substantially linear contact between the sealing gasket 36 and the part 32. Since the contact surface with the part 32 is less than in the prior art, the same force provides greater compression of the upper portion 54, and therefore improved contact between the part 32 and the sealing gasket 36, thereby facilitating the initiation of the vacuum in the cavity 37.

The upper portion 54 has right- and left-hand flanks 54.2, 54.3 on either side of the apex 54.1 that are extended by the upper faces 50.2, 52.2 of the right- and left-hand flanges 50, 52.

According to one layout, the maximum width L54 of the upper portion 54 is equal to or less than the width L48 of the lower portion 48, said width L54 diminishing gradually towards the apex 54.1. Overall, the width of the upper portion 54 is less than the width of the lower portion 48 of a sealing gasket 36 in the prior art, facilitating the curvature of the sealing gasket 36 in the curved sections of the groove 40.

Since the apex 54.1 of the upper portion 54 is a circular arc and the width L54 thereof is equal to or less than the width of the lower portion 48, the risk of pinching the gasket 36 between the part 32 and the tray 34 outside the groove 40 is limited. Thus, during compression, the sealing gasket 36 is necessarily contained in the groove 40.

According to one embodiment, the sealing gasket 36 has a longitudinal recess 56 that extends over the entire length thereof. According to one layout, this longitudinal recess 56 has a circular section. This longitudinal recess is positioned symmetrically about the vertical median plane PMV between the two flanges 50, 52, at least partially inside the lower portion 48 of the sealing gasket. This longitudinal recess 56 facilitates compression of the sealing gasket 36.

According to one embodiment, the diameter of the longitudinal recess 56 is substantially equal to the diameter of the circular arc of the apex 54.1. The width L48 of the lower portion 48 is substantially double the height H48 thereof. The height H48 of the lower portion 48 is substantially equal to the width L50, L52 of the flanges 50, 52. In the non-deformed state, approximately the top third of the sealing gasket 36 is positioned outside the groove 40. When in operation, with the sealing gasket 36 compressed, almost all of the section thereof is positioned inside the groove 40.

According to one embodiment, the sealing gasket 36 is made of a chloroprene elastomer.

The sealing gasket 36 according to the invention can be positioned in the grooves of existing vacuum tools in place of the sealing gaskets in the prior art.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A vacuum tool configured to immobilize a part, the vacuum tool comprising:
    a bearing surface,
    at least one sealing gasket that is interposed when in operation between the bearing surface and the part, and
    at least one groove in the bearing surface that has an opening configured to at least partially receive the sealing gasket therethrough,
        the groove having a central slot having a main bottom wall opposite the opening and main right- and left-hand side walls joined to the main bottom wall as well as right- and left-hand gaps that are arranged on either side of the central slot, each having a secondary bottom wall and a right- or left-hand secondary side wall,
    the sealing gasket having a lower portion within the central slot and an upper portion extending through the opening that is in contact with the part when in operation,
    wherein the sealing gasket has right- and left-hand flanges that are interposed between the lower and upper portions, that extend on either side of the lower portion, and that are seated respectively in the right- and left-hand gaps,
    wherein the secondary bottom wall of each right- and left-hand gaps and the bearing surface are separated by a first distance less than a second distance separating the main bottom wall of the central slot and the bearing surface, and
    wherein the right- and left-hand secondary side walls are separated by a distance greater than a distance separating the main right- and left-side walls.

2. The vacuum tool as claimed in claim 1, wherein each right- or left-hand flange has a lower face, an upper face, and an end face, and wherein a width of each of the right- and left-hand flanges is substantially equal to a width of the right- or left-hand gap receiving the respective flange, the lower and end faces of the right-hand flange being pressed respectively against the secondary bottom and secondary side walls of the right-hand gap, the lower and end faces of the left-hand flange being respectively pressed against the secondary bottom and secondary side walls of the left-hand gap.

3. The vacuum tool as claimed in claim 2, wherein a height of each end face of the right- and left-hand flanges is equal to or less than half of a depth of the right- and left-hand gaps.

4. The vacuum tool as claimed in claim 1, wherein the upper portion of the sealing gasket has an apex with a curved circular arc shape.

5. The vacuum tool as claimed in claim 4, wherein a radius of the curved circular arc is between 3 mm and 6 mm.

6. The vacuum tool as claimed in claim 1, wherein a maximum width of the upper portion is equal to or less than a width of the lower portion, diminishing gradually towards an apex of the sealing gasket.

7. The vacuum tool as claimed in claim 1, wherein the sealing gasket has a longitudinal recess.

8. The vacuum tool as claimed in claim 7, wherein the longitudinal recess is positioned between the right- and left-hand flanges, at least partially inside the lower portion of the sealing gasket.

9. The vacuum tool as claimed in claim 4,
wherein the sealing gasket has a longitudinal recess, and
wherein the longitudinal recess has a circular cross section and a diameter substantially equal to the diameter of the curved circular arc of the apex of the upper portion.

10. The vacuum tool as claimed in claim 1, wherein the sealing gasket is made of a chloroprene elastomer.

\* \* \* \* \*